United States Patent
Wang et al.

(10) Patent No.: US 10,674,410 B2
(45) Date of Patent: Jun. 2, 2020

(54) HANDOVER METHOD AND SYSTEM, AND APPARATUS

(71) Applicant: HUAWEI TECHNOLOGIES CO., LTD., Shenzhen, Guangdong (CN)

(72) Inventors: Jing Wang, Beijing (CN); Jie Ma, Shenzhen (CN); Bo Lin, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/358,473

(22) Filed: Mar. 19, 2019

(65) Prior Publication Data
US 2019/0215733 A1 Jul. 11, 2019

Related U.S. Application Data

(63) Continuation of application No. PCT/CN2016/101409, filed on Sep. 30, 2016.

(51) Int. Cl.
*H04W 36/00* (2009.01)
*H04W 36/08* (2009.01)
(Continued)

(52) U.S. Cl.
CPC ... *H04W 36/0009* (2018.08); *H04W 36/0005* (2013.01); *H04W 36/0016* (2013.01);
(Continued)

(58) Field of Classification Search
CPC ............. H04W 84/005; H04W 84/047; H04W 36/0055; H04W 36/0066; H04W 36/0033;
(Continued)

(56) References Cited

U.S. PATENT DOCUMENTS 8,843,640 B2 * 9/2014 Adachi ................. H04W 8/005
                                                                    709/227
10,039,138 B2 * 7/2018 Lecroart ............... H04L 69/322
(Continued)

FOREIGN PATENT DOCUMENTS

CN        101115045 A     1/2008
CN        101584141 A     11/2009
(Continued)

OTHER PUBLICATIONS

3GPP TSG-RAN3 Meeting #93, R3-162111, Huawei:"Consideration on FS feD2D_IoT relay_wearable", Sophia-Antipolls, France, Oct. 10-14, 2016. XP051162874. 4 pages.
(Continued)

*Primary Examiner* — Joseph Arevalo
(74) *Attorney, Agent, or Firm* — Womble Bond Dickinson (US) LLP

(57) ABSTRACT

Embodiments of the present invention provide a handover method to simplify a cross-base station handover procedure of a WD in a mobile communication scenario, and reduce power consumption of the WD. The method includes: sending, by a first base station, handover group information to a second base station, where the handover group information includes a first association relationship between a first terminal device and a second terminal device, and the second terminal device can communicate with the first base station through the first terminal device; and receiving, by the first base station, handover response information from the second base station, where the handover response information includes a second association relationship, and the second association relationship is established by the second base station between the first terminal device and the second terminal device based on the first association relationship.

18 Claims, 6 Drawing Sheets

(51) Int. Cl.
*H04W 52/02* (2009.01)
*H04W 24/10* (2009.01)
*H04W 88/02* (2009.01)
*H04W 88/04* (2009.01)

(52) U.S. Cl.
CPC ... *H04W 36/0033* (2013.01); *H04W 36/0072* (2013.01); *H04W 36/08* (2013.01); *H04W 52/0219* (2013.01); *H04W 24/10* (2013.01); *H04W 88/02* (2013.01); *H04W 88/04* (2013.01); *Y02D 70/00* (2018.01)

(58) Field of Classification Search
CPC . H04W 36/00; H04W 36/38; H04W 72/1236; H04W 76/15
USPC .... 455/437, 435.1, 509, 458, 524, 561, 436, 455/468
See application file for complete search history.

(56) References Cited

U.S. PATENT DOCUMENTS

| | | |
|---|---|---|
| 2006/0093062 A1 | 5/2006 | Yun et al. |
| 2009/0074189 A1 | 3/2009 | Ryu et al. |
| 2010/0002575 A1 | 1/2010 | Eichinger et al. |
| 2010/0061339 A1 | 3/2010 | Kim et al. |
| 2011/0249762 A1 | 10/2011 | Sun et al. |
| 2012/0002589 A1 | 1/2012 | Saifullah et al. |
| 2012/0120831 A1* | 5/2012 | Gonsa ............... H04W 76/15 370/252 |
| 2014/0016614 A1* | 1/2014 | Velev ............... H04W 4/70 370/331 |
| 2014/0064124 A1* | 3/2014 | Paladugu ............... H04W 76/19 370/252 |
| 2014/0135008 A1 | 5/2014 | Yu et al. |
| 2014/0206354 A1* | 7/2014 | Yasuoka ............... H04B 7/15 455/436 |
| 2015/0078248 A1* | 3/2015 | Han ............... H04W 76/12 370/315 |
| 2016/0278097 A1* | 9/2016 | Ueda ............... H04W 28/08 |
| 2017/0013092 A1* | 1/2017 | Chen ............... H04L 5/00 |
| 2017/0188362 A1* | 6/2017 | Cariou ............... H04J 11/00 |
| 2017/0228935 A1* | 8/2017 | Foster ............... H04W 4/023 |
| 2017/0272316 A1* | 9/2017 | Johnson ............... H04L 61/301 |
| 2019/0037629 A1* | 1/2019 | Ryu ............... H04W 76/19 |

FOREIGN PATENT DOCUMENTS

| | | | |
|---|---|---|---|
| CN | 101771648 A | 7/2010 | |
| CN | 103200634 A * | 7/2013 | ............ H04W 36/00 |

OTHER PUBLICATIONS

3GPP TSG-RAN WG2 Meeting #94, R2-164068, Kyocera:"Consideration of ProSe Relay operation for wearable devices", Nanjing, China, May 23-27, 2016.XP051105390. total 6 pages.
3GPP TSG-RAN WG2 #95, R2-165148, III:"Support non-3GPP access for wearables", Gothenburg, Sweden, Aug. 22-26, 2016. XP051144089. 5 pages.
3GPP TS 36.300 V13.3.0 (Mar. 2016);3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 13),total 6 pages.

* cited by examiner

HANDOVER METHOD AND SYSTEM, AND APPARATUS

CROSS-REFERENCE TO RELATED APPLICATIONS

This application is a continuation of International Application No. PCT/CN2016/101409, filed on Sep. 30, 2016, the disclosure of which is hereby incorporated by reference in its entirety.

TECHNICAL FIELD

The present invention relates to the field of communications technologies, and in particular, to a handover method and system, and an apparatus.

BACKGROUND

A wearable device (WD) may be usually connected to relay user equipment (Relay UE), such as a mobile phone, through Bluetooth, a wireless local area network (WLAN), or device-to-device (D2D), and then is connected to a base station through the relay user equipment, to receive a network service. In other words, a resource used by the WD to communicate with the base station through the relay user equipment needs to be mapped to a resource used by the relay UE to communicate with the base station.

In a mobile communication scenario, for example, when the WD and the relay UE move together from a cell 1 to a cell 2, if the cell 1 and the cell 2 are served by different base stations, both the WD and the relay UE need to be handed over from a base station 1 in the cell 1 to a base station 2 in the cell 2 to ensure that the WD can still transmit data through the relay UE. In this case, the WD and the relay UE each report a measurement report to a source base station (namely, the base station 1), to trigger the base station 1 to make a handover decision, send a handover request to a target base station, and finally separately hand over the WD and the relay UE to the target base station (namely, the base station 2) as two independent user equipment by using an radio resource control (RRC) reconfiguration procedure. In this case, when the WD reports a measurement report of the WD to the base station 2 again, the base station 2 is triggered to determine a resource mapping relationship between the WD and the relay UE, and hand over, by using another RRC reconfiguration procedure, the WD from a cellular link that is directly connected to the base station 2 to a trunk link that is indirectly connected to the base station 2 through the relay UE. In this way, the WD can subsequently transmit data with the base station 2 through the relay UE.

It can be learned that in the foregoing cross-base station handover procedure, the WD needs to report the measurement report to the source base station, to trigger the source base station to make a handover decision. Then, the WD is handed over to the target base station by using the RRC reconfiguration procedure, reports the measurement report to the target base station, to trigger the target base station to make a decision on handing over the WD from the cellular link that is directly connected to the base station to the trunk link that is indirectly connected to the base station by using the relay user equipment, and re-establishes a resource mapping relationship with the relay UE by using the RRC reconfiguration procedure. Consequently, an amount of signaling interaction is relatively large, and a handover procedure is relatively tedious, which is unconducive to power saving of a WD with a relatively small volume and a limited battery capacity.

SUMMARY

Embodiments of the present invention provide a handover method and system, and an apparatus, so as to simplify a cross-base station handover procedure of a WD in a mobile communication scenario, and reduce power consumption of the WD.

To achieve the foregoing objectives, the following technical solutions are used in the embodiments of the present invention.

According to a first aspect, an embodiment of the present invention provides a handover method, including: sending, by a first base station, handover group information to a second base station, where the handover group information includes a first association relationship between a first terminal device and a second terminal device (the second terminal device can communicate with the first base station through the first terminal device); and receiving, by the first base station, handover response information from the second base station, where the handover response information includes a second association relationship, and the second association relationship is established by the second base station between the first terminal device and the second terminal device based on the first association relationship, so that the handover group is handed over to the second base station. To be specific, in the handover method provided in this embodiment of the present invention, a source base station (the first base station) uses the first terminal device and the second terminal device that need to be handed over as one handover group, and sends the handover group information to a target base station (the second base station) before handover is performed, so that the target base station can pre-establish an association relationship between the first terminal device and the second terminal device in the handover group. Then, the first terminal device and the second terminal device in the handover group may be simultaneously handed over to the target base station only by using a reconfiguration process, and the second terminal device on which handover is performed may still communicate with the target base station through the first terminal device. In other words, the first terminal device "together with" the second terminal device are directly handed over to the target base station. Therefore, a cross-base station handover procedure in a mobile communication scenario is simplified, and power consumption of a WD is reduced.

In one embodiment, before the sending, by a first base station, handover group information to a second base station, the method further includes: determining, by the first base station, the first terminal device and the second terminal device as one handover group.

In one embodiment, the determining, by the first base station, the first terminal device and the second terminal device as one handover group includes: receiving, by the first base station, a first measurement report from the first terminal device, where the first measurement report carries a communication link measurement result between the first terminal device and the second terminal device; and determining, by the first base station, the first terminal device and the second terminal device as one handover group based on the communication link measurement result in the first measurement report.

In one embodiment, the determining, by the first base station, the first terminal device and the second terminal device as one handover group includes: receiving, by the first base station, a second measurement report from the second terminal device through the first terminal device, where the second measurement report carries a communication link measurement result between the first terminal device and the second terminal device; and determining, by the first base station, the first terminal device and the second terminal device as one handover group based on the communication link measurement result in the second measurement report.

In one embodiment, the determining, by the first base station, the first terminal device and the second terminal device as one handover group includes: obtaining, by the first base station, context information of the first terminal device and/or the second terminal device; and if the context information indicates that there is a communication connection relationship or a pairing relationship between the first terminal device and the second terminal device, determining, by the first base station, the first terminal device and the second terminal device as one handover group.

In one embodiment, the first association relationship includes at least one of the following relationships: a mapping relationship between a radio bearer (RB) of the second terminal device and an RB of the first terminal device (RBs of the first terminal device to which all RBs of the second terminal device need to be mapped are notified to the second base station), a communication connection relationship between the first terminal device and the second terminal device, and a pairing relationship between the first terminal device and the second terminal device, so that the second base station prepares, based on the handover group information, to simultaneously hand over the first terminal device and the second terminal device to the second base station.

In one embodiment, the handover group information further includes identity indication information, and the identity indication information is used to indicate that the first terminal device is a relay device.

In one embodiment, the handover group information further includes relay protocol stack architecture information, and the relay protocol stack architecture information is used to indicate a type of a relay architecture used by the second terminal device to connect to the first base station through the first terminal device.

In one embodiment, the handover group information further includes E-RAB (E-UTRAN Radio Access Bearer) information of the first terminal device and the second terminal device (including E-RAB IDs, QoS parameters, and the like), and/or RRC context information of the first terminal device and the second terminal device.

In one embodiment, the second association relationship includes at least one of the following relationships: a mapping relationship that is between an RB of the second terminal device and an RB of the first terminal device and that is established by the second base station, a communication connection relationship that is between the first terminal device and the second terminal device and that is established by the second base station, and a pairing relationship that is between the first terminal device and the second terminal device and that is established by the second base station.

In one embodiment, after the receiving, by the first base station, handover response information from the second base station, the method further includes: sending, by the first base station, an RRC reconfiguration message to the second terminal device through the first terminal device; and if RRC reconfiguration acknowledgement information sent by the second terminal device through the first terminal device is received, triggering the first base station to send the RRC reconfiguration message to the first terminal device, so that the first terminal device sends an RRC reconfiguration complete message to the second base station after completing RRC reconfiguration and connecting to the second base station, where the RRC reconfiguration complete message is used to indicate that both the first terminal device and the second terminal device in the handover group are handed over to the second base station. To be specific, when the first terminal device and the second terminal device perform an RRC reconfiguration procedure, the source base station (the first base station) may first send the RRC reconfiguration message to the second terminal device through the first terminal device, and then sends the RRC reconfiguration message to the first terminal device after receiving the RRC reconfiguration acknowledgement information from the second terminal device through the first terminal device. It is equivalent to indirectly notifying the first terminal device that the second terminal device has completed the reconfiguration procedure. Then, the first terminal device may directly send the RRC reconfiguration complete message to the target base station (the second base station) after completing the reconfiguration procedure and successfully connecting to a target cell, so that the second base station learns that both the first terminal device and the second terminal device in the handover group have been handed over to the second base station.

According to a second aspect, an embodiment of the present invention provides a handover method, including: receiving, by a second base station, handover group information from a first base station, where the handover group information includes a first association relationship between a first terminal device and a second terminal device in a handover group, and the second terminal device can communicate with the first base station through the first terminal device; establishing, by the second base station, a second association relationship between the first terminal device and the second terminal device based on the first association relationship; and sending, by the second base station, handover response information to the first base station, where the handover response information carries the second association relationship.

In one embodiment, the second association relationship includes at least one of the following relationships: a mapping relationship between a radio bearer RB of the second terminal device and an RB of the first terminal device, a communication connection relationship between the first terminal device and the second terminal device, and a pairing relationship between the first terminal device and the second terminal device.

In one embodiment, after the sending, by the second base station, handover response information to the first base station, the method further includes: receiving, by the second base station, an RRC reconfiguration complete message from the first terminal device, where the RRC reconfiguration complete message is used to indicate that the handover group has been handed over to the second base station.

According to a third aspect, an embodiment of the present invention provides a handover method, including: receiving, by a second terminal device through a first terminal device, an RRC reconfiguration message from a first base station; and sending, by the second terminal device, RRC reconfiguration acknowledgement information to the first terminal device or to the first base station through the first terminal device, where the second terminal device can communicate with the first base station through the first terminal device.

According to a fourth aspect, an embodiment of the present invention provides a base station, where the base station is a first base station in handover, and the first base station includes: a processing unit, configured to generate handover group information, where the handover group information includes a first association relationship between a first terminal device and a second terminal device, and the second terminal device can communicate with the first base station through the first terminal device; a sending unit, configured to send the handover group information to a second base station; and a receiving unit, configured to receive handover response information from the second base station, where the handover response information includes a second association relationship, and the second association relationship is established by the second base station between the first terminal device and the second terminal device based on the first association relationship.

In a one embodiment, the processing unit is further configured to determine the first terminal device and the second terminal device as one handover group.

In one embodiment, the receiving unit is further configured to receive a first measurement report from the first terminal device, where the first measurement report carries a communication link measurement result between the first terminal device and the second terminal device; and the processing unit is specifically configured to determine the first terminal device and the second terminal device as one handover group based on the communication link measurement result in the first measurement report.

In one embodiment, the receiving unit is further configured to receive a second measurement report from the second terminal device through the first terminal device, where the second measurement report carries a communication link measurement result between the first terminal device and the second terminal device; and the processing unit is specifically configured to determine the first terminal device and the second terminal device as one handover group based on the communication link measurement result in the second measurement report.

In one embodiment, the processing unit is specifically configured to: obtain context information of the first terminal device or the second terminal device; and if the context information indicates that there is a communication connection relationship or a pairing relationship between the first terminal device and the second terminal device, determine the first terminal device and the second terminal device as one handover group.

According to a fifth aspect, an embodiment of the present invention provides a base station, where the base station is a second base station in handover, including: a receiving unit, configured to receive handover group information from a first base station, where the handover group information includes a first association relationship between a first terminal device and a second terminal device in a handover group, and the second terminal device can communicate with the first base station through the first terminal device; a processing unit, configured to establish a second association relationship between the first terminal device and the second terminal device based on the first association relationship; and a sending unit, configured to send handover response information to the first base station, where the handover response information carries the second association relationship.

In one embodiment, the receiving unit is further configured to receive an RRC reconfiguration complete message from the first terminal device, where the RRC reconfiguration complete message is used to indicate that the handover group has been handed over to the second base station.

According to a sixth aspect, an embodiment of the present invention provides a terminal device, including: a receiving unit, configured to receive, through a first terminal device, an RRC reconfiguration message from a first base station; a processing unit, configured to generate RRC reconfiguration acknowledgement information based on the RRC reconfiguration message; and a sending unit, configured to send the RRC reconfiguration acknowledgement information to the first terminal device or to the first base station through the first terminal device, where the second terminal device can communicate with the first base station through the first terminal device.

According to a seventh aspect, an embodiment of the present invention provides a base station such as the first base station or the second base station described above, and the base station includes a processor, a memory, a bus, and a communications interface, where the memory is configured to store a computer execution instruction; and the processor is connected to the memory through the bus, and when the base station runs, the processor executes the computer execution instruction stored in the memory, so that the base station performs any handover method described above.

According to an eighth aspect, an embodiment of the present invention provides a handover system, including the first base station, the second base station, the first terminal device, and the second terminal device described above, where the second terminal device can communicate with the first base station through the first terminal device.

According to a ninth aspect, an embodiment of the present invention provides a computer storage medium, configured to store a computer software instruction used by any base station described above (for example, the first base station or the second base station), where the computer software instruction includes a program designed for the base station to perform the foregoing aspects.

According to a tenth aspect, an embodiment of the present invention provides a computer storage medium, configured to store a computer software instruction used by any terminal device described above (for example, the first terminal device or the second terminal device), where the computer software instruction includes a program designed for the terminal device to perform the foregoing aspects.

In the embodiments of the present invention, names of the first base station, the second base station, the first terminal device, and the second terminal device constitute no limitation on the devices or the function modules. In actual implementation, the devices or the function modules may have other names. All devices or function modules having functions similar to those in the present invention fall within the scope defined by the claims of the present invention and equivalent technologies of the present invention.

In addition, for the technical effects brought by any embodiments in the second aspect to the tenth aspect, refer to the technical effects brought by different embodiments in the first aspect. Details are not described herein again.

These or other aspects of the present invention are clearer and more comprehensible in descriptions of the following embodiments.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the present invention, "a plurality of" means two or at least two unless otherwise stated.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

For ease of description, in the embodiments of the present invention, a first base station is a source base station, and a second base station is a target base station.

Figure 1:
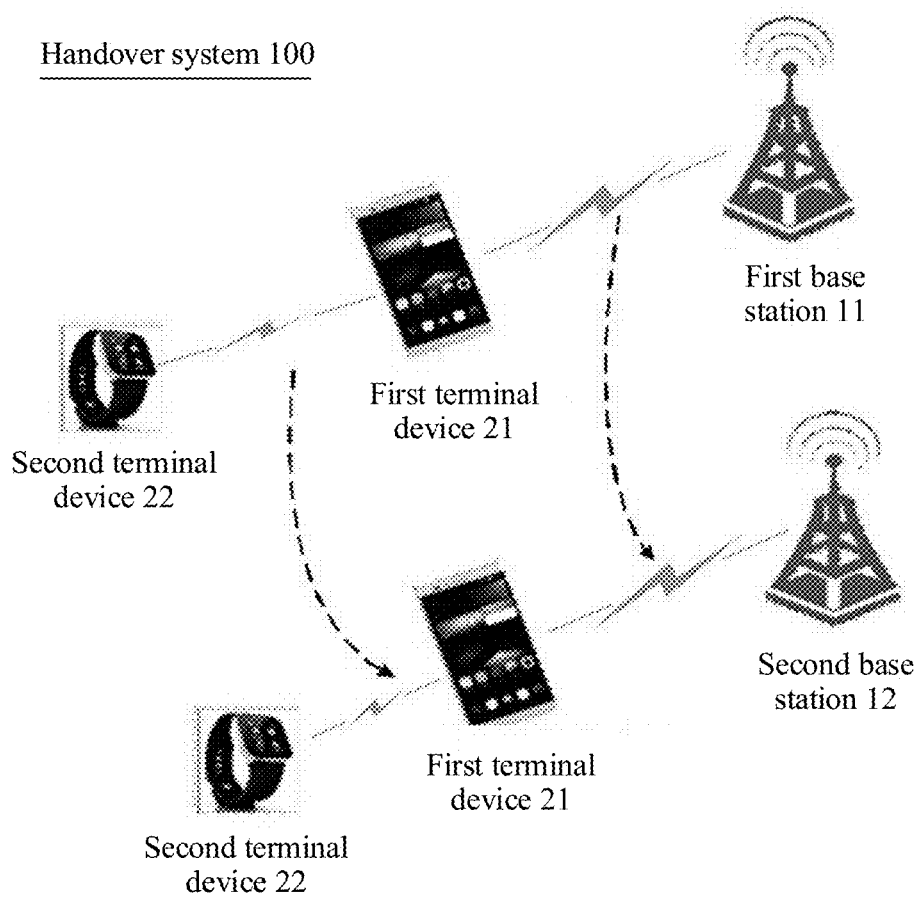
FIG. 1 is a schematic architectural diagram of a handover system according to an embodiment of the present invention.

An embodiment of the present invention provides a handover method that may be applied to a handover system 100 shown in FIG. 1. The system may include a first base station 11, a second base station 12, a first terminal device 21, and a second terminal device 22.

The second terminal device 22 may establish a communication connection to any base station (for example, the first base station 11 or the second base station 12) through the first terminal device 21. The second terminal device 22 may be any terminal device, for example, a wearable device (WD) such as a smartwatch or a smart band, a virtual reality device such as virtual reality (VR) glasses, or an Internet of Things device such as a smart meter or a smart water meter.

The first terminal device 21 may be any terminal device such as a mobile phone or a tablet computer. In this case, the second terminal device 22 may be connected to the first terminal device 21 through Bluetooth, a WLAN, Long Term Evolution (LTE) D2D, or 5th Generation (5G) D2D, and then is connected to the first base station 11 or the second base station 12 through the first terminal device 21, to receive a network service.

In a mobile communication scenario, the first terminal device 21 and the second terminal device 22 may move together from a cell 1 covered by the first base station 11 to a cell 2 covered by the second base station 12. For example, a mobile phone (the first terminal device 21) and a smartwatch (the second terminal device 22) carried by a user move from the cell 1 to the cell 2. Therefore, to ensure that the second terminal device 22 can still transmit data with a network through the first terminal device 21, both the first terminal device 21 and the second terminal device 22 need to be handed over from the first base station (a source base station) 11 to the second base station (a target base station) 12.

Figure 2:
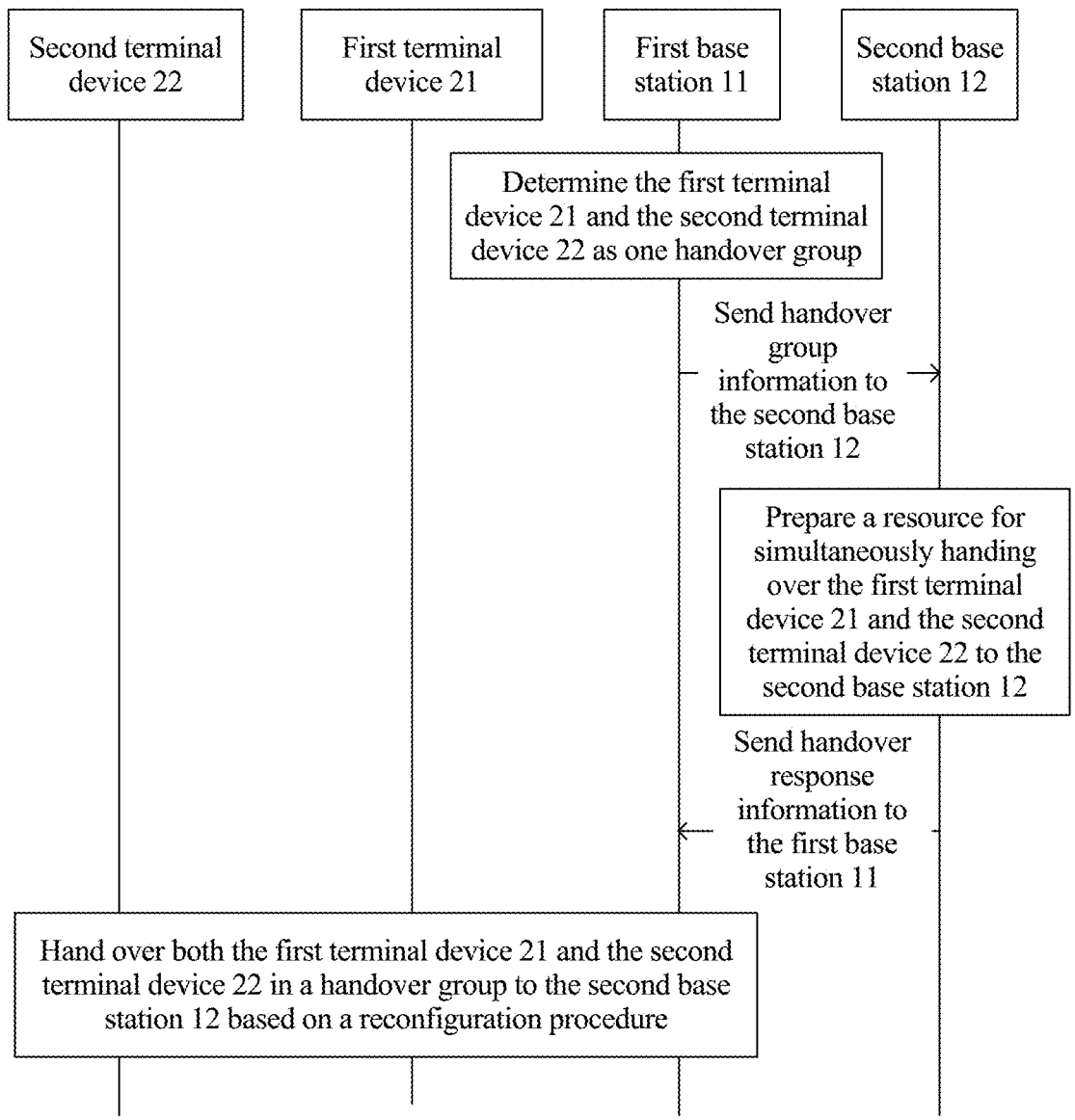
FIG. 2 is a schematic interaction diagram 1 of a handover method according to an embodiment of the present invention.

Therefore, in the handover method provided in this embodiment of the present invention, as shown in FIG. 2, when the first base station 11 determines the first terminal device 21 and the second terminal device 22 as one handover group, the first base station 11 may send handover group information to the second base station 12, notifying the second base station 12 that the first terminal device 21 and the second terminal device 22 need to be handed over to the second base station 12 together as one handover group, where the handover group information includes a first association relationship between the first terminal device 21 and the second terminal device 22. In this way, the second base station 12 may prepare, based on the handover group information, to simultaneously hand over the first terminal device 21 and the second terminal device 22 to the second base station 12, for example, establish a second association relationship (the second association relationship may be the same as or different from the first association relationship) between the first terminal device 21 and the second terminal device 22 based on the first association relationship, add the second association relationship to handover response information, and send the handover response information to the first base station 11. Then, the first base station 11 may forward reconfiguration information of the first terminal device and/or the second terminal device in the handover response information to the first terminal device 21 and/or the second terminal device 22 in the handover group by using an RRC reconfiguration message, to instruct the handover group to be handed over to the second base station 12 based on the reconfiguration information.

It can be learned that compared with a typical process in which a WD and relay UE are separately connected to a target base station as two independent user equipment, and then the target base station establishes an association relationship between the WD and the relay UE, so that the WD indirectly communicates with the target base station through the relay UE, in the handover method provided in this embodiment of the present invention, the source base station uses the first terminal device and the second terminal device that need to be handed over as one handover group, and sends the handover group information to the target base station before handover is performed, so that the target base station can pre-establish an association relationship between the first terminal device and the second terminal device in the handover group. Then, the first terminal device and the second terminal device in the handover group may be simultaneously handed over to the target base station only by using a reconfiguration process, and the second terminal device on which handover is performed may still communicate with the target base station through the first terminal device. In other words, the first terminal device "together with" the second terminal device are directly handed over to the target base station. Therefore, an amount of signaling interaction between network elements in the handover system 100 is reduced, a cross-base station handover procedure in the mobile communication scenario is simplified, and power consumption of the WD is reduced.

It should be noted that the foregoing handover system 100 may be specifically used in a cellular network system such as an LTE system or a mobile communications system in which hybrid networking between LTE and another wireless communications system (for example, Bluetooth or a WLAN) is implemented. This is not limited in this embodiment of the present invention.

Figure 3:
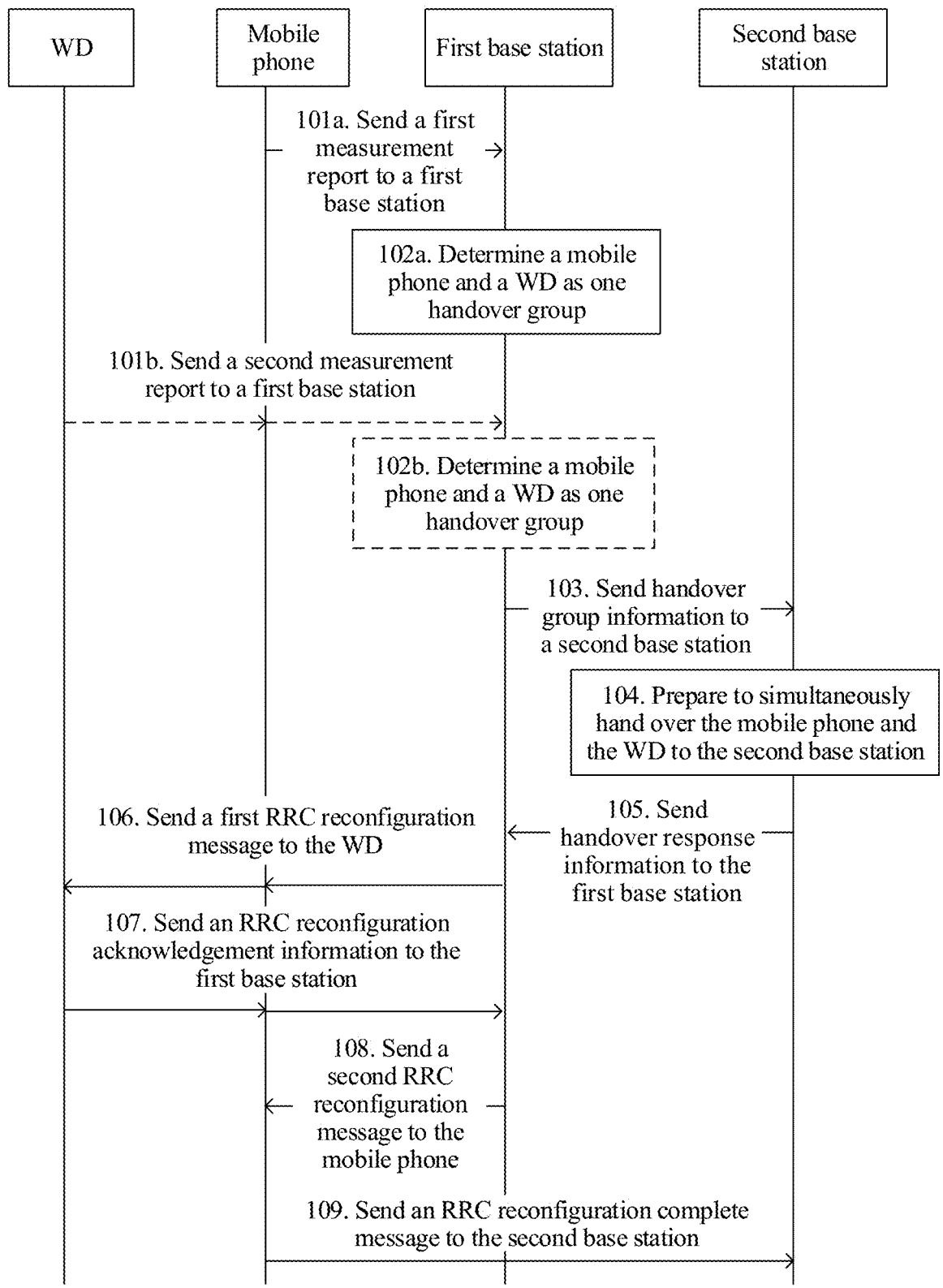
FIG. 3 is a schematic interaction diagram 2 of a handover method according to an embodiment of the present invention.

An example in which the mobile phone is the first terminal device 21, and the WD is the second terminal device 22 is used below to describe in detail the handover method provided in this embodiment of the present invention. As shown in FIG. 3, the method includes the following blocks.

Block 101a. The mobile phone sends a first measurement report to a first base station, where the first measurement report carries a communication link measurement result between the mobile phone and the WD.

Specifically, a base station serving a cell 1 is the first base station. When the mobile phone and the WD are located in the cell 1, a radio bearer (RB) between the WD and the first base station may be mapped to one or more RBs between the mobile phone and the first base station, so that the WD can communicate with the first base station through the mobile phone. In a process in which the mobile phone communicates with the first base station, the mobile phone may measure quality of a communication link between the mobile phone and the WD, add the communication link measurement result between the mobile phone and the WD to the first measurement report, and send the first measurement report to the first base station.

The mobile phone may periodically send the first measurement report to the first base station, or a trigger condition may be set in the mobile phone. For example, when it is detected that signal strength between the mobile phone and the first base station is less than a preset threshold, the mobile phone is triggered to send the first measurement report to the first base station. This is not limited in this embodiment of the present invention.

Block 102a. The first base station determines the mobile phone and the WD as one handover group based on the communication link measurement result in the first measurement report.

Specifically, when the communication link measurement result indicates that the quality of the communication link between the mobile phone and the WD is relatively good, for example, when signal strength on the communication link between the mobile phone and the WD is greater than a preset value, it may be considered that the quality of the communication link between the mobile phone and the WD is relatively good. In other words, a relative distance between the mobile phone and the WD changes slightly. In this case, the first base station may determine the mobile phone and the WD as one handover group, and if the first base station further determines that the mobile phone or the WD needs to be handed over to the second base station, the first base station may hand over the mobile phone and the WD to the second base station together as one handover group.

It should be noted that the first measurement report may not carry the communication link measurement result between the mobile phone and the WD. In this case, to determine whether the mobile phone and the WD are one handover group, the first base station may perform the following blocks 101b and 102b.

Block 101b. The WD sends a second measurement report to the first base station through the mobile phone, where in this case, the second measurement report carries a communication link measurement result between the mobile phone and the WD.

Block 102b. The first base station determines the mobile phone and the WD as one handover group based on the communication link measurement result in the second measurement report.

Alternatively, the first base station may implicitly determine the mobile phone and the WD as one handover group.

Specifically, because the WD and the mobile phone are in an RRC_CONNECTED mode, the first base station stores context information of the WD and/or the mobile phone. Therefore, by obtaining the context information of the WD and/or the mobile phone, the first base station may determine, from the context information, whether there is a communication connection relationship/a pairing relationship/an association relationship between the mobile phone and the WD. If the context information indicates that there is the communication connection relationship/the pairing relationship/the association relationship between the mobile phone and the WD, the first base station may determine that the mobile phone and the WD need to be used as one handover group.

It should be noted that there may be one or more second terminal devices included in the handover group. This is not limited in this embodiment of the present invention. To be specific, a plurality of second terminal devices may communicate with the first base station through a same relay device (namely, the first terminal device), and the first base station may determine that the first terminal device "together with" the plurality of second terminal devices are handed over to the second base station.

Block 103. The first base station sends handover group information to a second base station.

The handover group information includes a first association relationship between the mobile phone and the WD, to notify the second base station that the mobile phone and the WD are one handover group having an association relationship, and need to be handed over from the first base station to the second base station together.

Specifically, the first base station may add the handover group information to a handover request (Handover request) message, and further send the handover request message to the second base station.

For example, after the mobile phone and the WD are handed over to the second base station, the WD still needs to communicate with the second base station through the mobile phone. In other words, an RB between the WD and the second base station needs to be mapped to an RB between the mobile phone and the second base station for indirect communication between the WD and the second base station. Therefore, the first association relationship may specifically include a mapping relationship between an RB of the WD and an RB of the mobile phone. In other words, RBs of the mobile phone to which all RBs of the WD need to be mapped are notified to the second base station.

Alternatively, the first association relationship may further specifically include the communication connection relationship between the mobile phone and the WD and/or the pairing relationship between the mobile phone and the WD. This is not limited in this embodiment of the present invention.

Further, because the second base station does not know which user equipment in the first association relationship is the relay device (namely, the first terminal device), the handover group information may further include identity indication information. The identity indication information is used to indicate that the mobile phone is the relay device. For example, one or more bits may be set in the handover group information to indicate that the first terminal device (the mobile phone) or the second terminal device (the WD) in the first association relationship is the relay device. Apparently, in this embodiment of the present invention, the mobile phone may be used as the relay device, and then the WD needs to communicate with the second base station through the relay device (namely, the mobile phone).

Further, the handover group information may further include relay protocol stack architecture information, and the relay protocol stack architecture information is used to indicate a type of a relay architecture used by the WD to connect to the first base station through the mobile phone.

Specifically, there are at least three different types of existing relay protocol stack architectures, for example, a relay architecture in which a base station is used as a relay and a relay architecture in which UE is used as a relay (the relay architecture in which the UE is used as the relay is further divided into a layer 2 relay architecture and a layer 3 relay architecture based on a location, in a protocol stack, of a relay layer that implements a relay function). Content of handover preparation made by the target base station (namely, the second base station) varies with a type of a relay protocol stack architecture. Therefore, the first base station may indicate, by using the relay protocol stack architecture information, the type of the relay architecture used by the WD to connect to the first base station through the mobile phone, for example, the layer 2 relay architecture is used by the WD to connect to the first base station through the mobile phone. Therefore, the second base station may determine, based on the relay protocol stack architecture information, a type of a relay architecture subsequently used by the WD to connect to the second base station through the mobile phone.

Generally, the type of the relay architecture used by the WD to connect to the second base station through the mobile phone is the same as the type of the relay architecture used by the WD to connect to the first base station through the mobile phone.

Layer 2 includes three sublayers: a Packet Data Convergence Protocol (PDCP) layer, an Radio Link Control (RLC) layer, and a Media Access Control (MAC) layer, and layer 3 is an RRC layer or an Internet Protocol (IP) layer.

For example, to enable the WD to communicate with the second base station through the mobile phone, the second base station needs to establish the mapping relationship between an RB of the WD and an RB of the mobile phone. In this case, the second base station first needs to establish a corresponding protocol stack to parse a data packet subsequently sent by the WD or the mobile phone. The WD communicates with the second base station through the mobile phone as the relay device. Therefore, the second base station needs to establish a corresponding relay protocol stack.

Optionally, a relay layer in the relay protocol stack used in this embodiment of the present invention may be specifically set at any location between the PDCP layer and the MAC layer (including the PDCP layer and the MAC layer). For example, the relay layer may be set between the PDCP layer and the RLC layer, between the RLC layer and the MAC layer, or at the PDCP layer, the RLC layer, or the MAC layer. In other words, in this embodiment of the present invention, the type of the relay architecture used by the WD to connect to the second base station through the mobile phone may be any layer 2 relay-based relay architecture type. Subsequently, the second base station may establish the corresponding relay protocol stack based on the relay protocol stack architecture information, to parse the data packet subsequently sent by the WD.

Alternatively, the relay protocol stack architecture information may be only an indication identifier. In this case, as shown in Table 1, the second base station may pre-store a correspondence between a relay protocol stack architecture type and an indication identifier. In this way, after receiving an indication identifier carried in the handover group information, the second base station may determine, based on the correspondence that is between a relay protocol stack architecture type and an indication identifier and that is shown in Table 1, a relay protocol stack architecture type corresponding to the indication identifier carried in the handover group information, namely, the type of the relay architecture used by the WD to connect to the second base station through the mobile phone.

TABLE 1

| Indication identifier | Relay protocol stack architecture type |
|---|---|
| 01 | Layer 2 relay architecture |
| ... | ... |

Further, the handover group information may further include: E-RAB (E-UTRAN Radio Access Bearer, evolved universal terrestrial radio access network radio access bearer) information of the mobile phone and the WD, and/or RRC context information of the mobile phone and the WD.

The E-RAB information may specifically include at least one of an E-RAB ID, a quality of service (QoS) parameter value corresponding to the E-RAB, a tunnel endpoint ID of an uplink GPRS tunneling protocol (GTP), and a transport layer address of each of the mobile phone and the WD.

Typically, when the mobile phone and the WD are handed over to the second base station, the first base station needs to respectively send two handover request messages, to separately send the E-RAB information and/or the RRC context information of the mobile phone and the E-RAB information and/or the RRC context information of the WD to the second base station. In this embodiment of the present invention, the first base station may add both the E-RAB information and/or the RRC context information of the mobile phone and the E-RAB information and/or the RRC context information of the WD to the handover group information, and send the handover group information to the second base station by using one handover request message, so as to reduce signaling interaction between the first base station and the second base station.

Block 104. The second base station prepares, based on the handover group information, to simultaneously hand over the mobile phone and the WD to the second base station.

Specifically, after receiving the handover group information, the second base station may simultaneously prepare, based on the handover group information, to hand over the mobile phone and the WD across base stations. For example, the mapping relationship between an RB of the WD and an RB of the mobile phone or the pairing relationship between the WD and the mobile phone is established based on the first association relationship in the handover group information, namely, a second association relationship between the mobile phone and the WD is established.

Herein, the second association relationship may be the same as or different from the first association relationship. Generally, the second base station establishes a corresponding RB mapping relationship based on the first association relationship provided by the first base station, for example, the RB mapping relationship between the mobile phone and the WD. However, due to some limitation factors, for example, when resources allocated by the second base station to the handover group are inadequate, the second base station may establish a new RB mapping relationship between the mobile phone and the WD. For example, the first association relationship may indicate that an RB 1 of the WD is mapped to an RB 2 of the mobile phone. However, when the RB 2 of the mobile phone has been occupied, the second base station may map the RB 1 of the WD to another RB of the mobile phone such as an RB 3. In this case, an obtained second association relationship is different from the first association relationship.

Block 105. The second base station sends handover response information to the first base station.

In block 105, the second base station may add the second association relationship to the handover response information, and send the handover response information to the first base station, so that the first base station learns of the association relationship (namely, the second association relationship) actually established by the second base station between the mobile phone and the WD.

The handover response information may be specifically a handover request acknowledgement message. The handover request acknowledgement message includes both RRC reconfiguration information of the WD and reconfiguration information of the mobile phone.

In one embodiment, the handover request acknowledgement message may further include information such as a temporary identifier and a security algorithm identifier that is allocated by the second base station to each of the mobile phone and the WD. This is not limited in this embodiment of the present invention.

Block 106. The first base station sends a first RRC reconfiguration message to the WD through the mobile phone.

Block 107. After correctly receiving the first RRC reconfiguration message, or after completing reconfiguration based on the first RRC reconfiguration message, the WD sends RRC reconfiguration acknowledgement information to the first base station through the mobile phone.

In block 106, after receiving the handover response information, the first base station may perform encryption and integrity protection on the RRC reconfiguration information of the WD in the handover response information, generate the first RRC reconfiguration message, and send the first RRC reconfiguration message to the WD through the mobile phone.

Further, in block 107, after correctly receiving the first RRC reconfiguration message, the WD may send the RRC reconfiguration acknowledgement information to the first base station. In one embodiment, the WD may first perform reconfiguration based on the first RRC reconfiguration message, for example, reconfigure a Packet Data Convergence Protocol (PDCP) entity, reconfigure a security algorithm, and reconfigure a user plane data processing function. After completing the reconfiguration, the WD sends the RRC reconfiguration acknowledgement information to the first base station, to notify the first base station that the WD has completed a reconfiguration procedure and may be handed over to the second base station.

It may be understood that in this embodiment of the present invention, the mobile phone (the first terminal device) is used as the relay device of the WD (the second terminal device). Therefore, when the second terminal device communicates with the first base station or the second base station, the first terminal device needs to forward a message sent by the second terminal device to the first base station or the second base station, or the first terminal device forwards a message sent by the first base station or the second base station to the second terminal device.

Block 108. The first base station sends a second RRC reconfiguration message to the mobile phone.

Block 109. After performing reconfiguration based on the second RRC reconfiguration message and connecting to the second base station, the mobile phone sends an RRC reconfiguration complete message to the second base station.

Specifically, in block 108, the first base station may further perform encryption and integrity protection on the RRC reconfiguration information of the mobile phone in the handover response information, generate the second RRC reconfiguration message, and send the second RRC reconfiguration message to the mobile phone.

Therefore, after receiving the second RRC reconfiguration message, the mobile phone may trigger a reconfiguration and random access procedure. After completing reconfiguration and successfully connecting to the second base station, the mobile phone sends the RRC reconfiguration complete message to the second base station. The RRC reconfiguration complete message is used to indicate, to the second base station, that both the mobile phone (the first terminal device) and the WD (the second terminal device) in the handover group are handed over to the second base station. Then, the WD may communicate with the second base station based on the second association relationship established by the second base station for the WD and through the mobile phone that is used as the relay device.

It can be learned that in the handover method provided in this embodiment of the present invention, when the first terminal device and the second terminal device perform an RRC reconfiguration procedure, the source base station (the first base station) may first send the RRC reconfiguration message to the second terminal device through the first terminal device, and then sends the RRC reconfiguration message to the first terminal device after receiving the RRC reconfiguration acknowledgement information from the second terminal device. It is equivalent to indirectly notifying the first terminal device that the second terminal device has completed the reconfiguration procedure. Then, the first terminal device may directly send the RRC reconfiguration complete message to the target base station (the second base station) after completing the reconfiguration procedure, so that the second base station learns that both the first terminal device and the second terminal device in the handover group have been handed over to the second base station.

In one embodiment, the first base station may send the RRC reconfiguration message separately to the first terminal device and to the second terminal device through the first terminal device. After correctly receiving the RRC reconfiguration message, the second terminal device may send the RRC reconfiguration acknowledgement information to the first terminal device. Then, after completing the reconfiguration procedure, the first terminal device may directly send the RRC reconfiguration complete message to the second base station.

Therefore, the handover method provided in this embodiment of the present invention may be applied to the foregoing handover system. When the first terminal device and the second terminal device need to be handed over from the first base station to the second base station, the first base station uses the first terminal device and the second terminal device as one handover group, and sends the handover group information to the second base station before handover is performed, so that the second base station can pre-establish the association relationship between the first terminal device and the second terminal device in the handover group. Then, the first terminal device and the second terminal device in the handover group may be simultaneously handed over to the target base station only by using a reconfiguration process, and the second terminal device on which handover is performed may still communicate with the second base station through the first terminal device. In other words, the first terminal device "together with" the second terminal device are directly handed over to the second base station. Therefore, an amount of signaling interaction between network elements in the handover system is reduced, a cross-base station handover procedure in the mobile communication scenario is simplified, power consumption of the second terminal device is reduced, and service continuity of the second terminal device is ensured.

In another possible design, the first terminal device and the second terminal device may be still separately handed over to the second base station as two independent terminal devices based on an existing handover procedure. Typically, the second terminal device reports a measurement report or a path switching request to the target base station, to trigger the target base station to hand over the second terminal device from a cellular link that is directly connected to the target base station to a trunk link that is indirectly connected to the target base station through the first terminal device, and establish an association relationship between the second terminal device and the first terminal device. In the handover method provided in this embodiment of the present invention, after the first terminal device and the second terminal device are separately handed over to the second base station (namely, the target base station), the first base station may send the first association relationship between the first terminal device and the second terminal device to the second base station, and the second base station establishes the second association relationship (the second association relationship may be the same as or different from the first association relationship) between the first terminal device and the second terminal device based on the first association relationship. Then, the RRC reconfiguration message may be used to instruct the first terminal device and the second terminal device to perform the reconfiguration procedure, so that the second terminal device can finally communicate with the second base station through the first terminal device based on the second association relationship.

Figure 4:
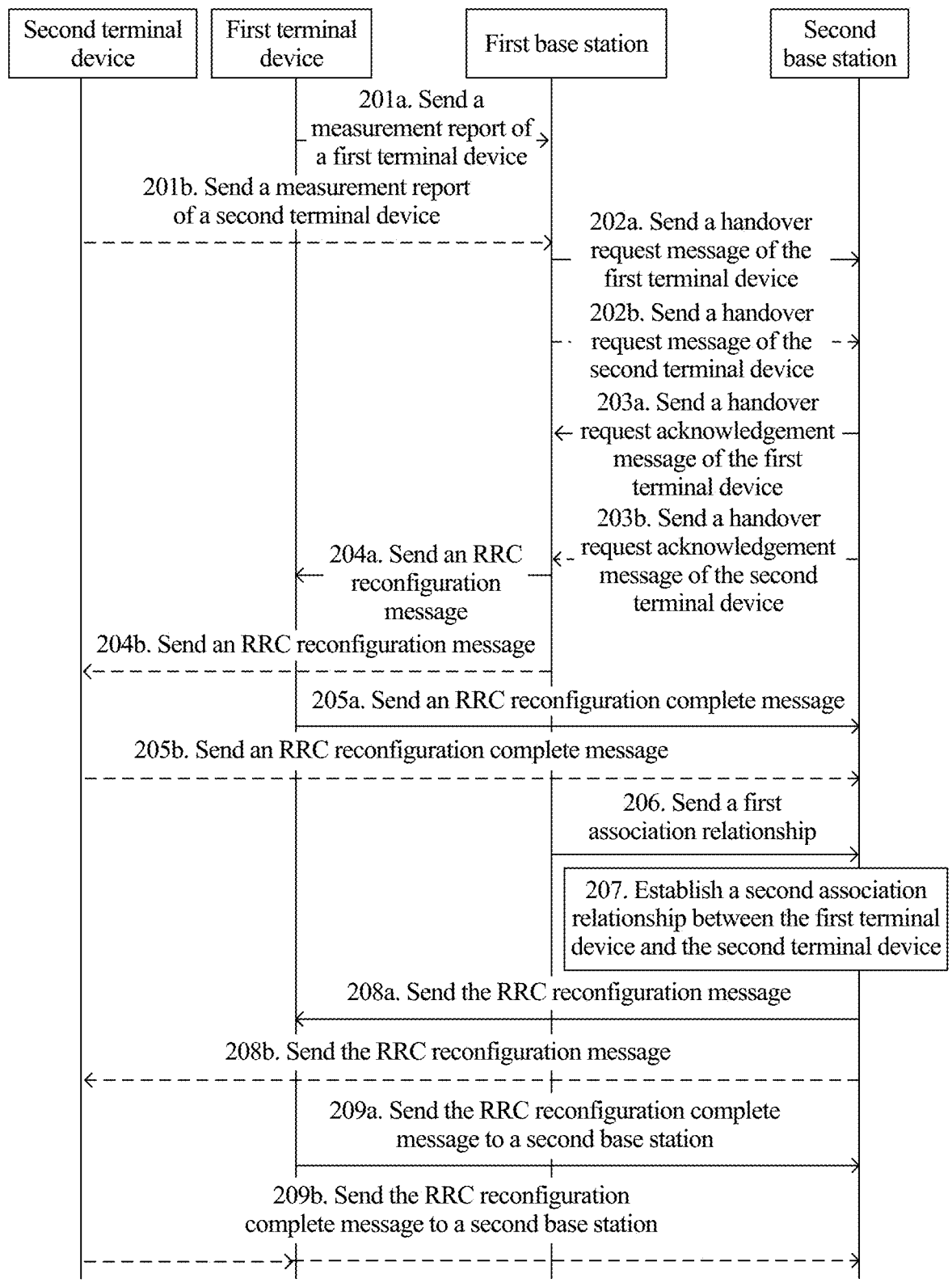
FIG. 4 is a schematic interaction diagram 3 of a handover method according to an embodiment of the present invention.

For example, FIG. 4 shows a specific implementation of the handover method, and the handover method includes the following blocks.

Block 201a. A first terminal device sends a measurement report of the first terminal device to a first base station.

Block 202a. The first base station sends a handover request message of the first terminal device to a second base station based on the measurement report of the first terminal device.

Block 203a. The second base station prepares, based on the handover request message of the first terminal device, to hand over the first terminal device to the second base station, and sends a handover request acknowledgement message of the first terminal device to the first base station.

Block 204a. The first base station sends an RRC reconfiguration message to the first terminal device.

Block 205a. After completing reconfiguration and successfully connecting to the second base station, the first terminal device sends an RRC reconfiguration complete message to the second base station, notifying the second base station that the first terminal device has been handed over.

Similar to the process in which the first terminal device is handed over to the second base station, a second terminal device may also be handed over to the second base station in the foregoing procedure.

Block 201b. A second terminal device sends a measurement report of the second terminal device to a first base station.

Block 202b. The first base station sends a handover request message of the second terminal device to a second base station based on the measurement report of the second terminal device.

Block 203b. The second base station prepares, based on the handover request message of the second terminal device, to hand over the second terminal device to the second base station, and sends a handover request acknowledgement message of the second terminal device to the first base station.

Block 204b. The first base station sends an RRC reconfiguration message to the second terminal device.

Block 205b. After completing reconfiguration and successfully connecting to the second base station, the second terminal device sends an RRC reconfiguration complete message to the second base station, notifying the second base station that the second terminal device has been handed over.

Therefore, in the foregoing blocks 201a to 205a and blocks 201b to 205b, the first terminal device and the second terminal device may be separately handed over to the second base station. In this case, both the first terminal device and the second terminal device are in a direct communication state with the second base station.

To use the first terminal device as a relay device of the second terminal device, and enable the second terminal device to indirectly communicate with the second base station through the first terminal device, the following block 206 may be performed:

Block 206. The first base station sends a first association relationship between the first terminal device and the second terminal device to the second base station.

Block 207. The second base station establishes a second association relationship between the first terminal device and the second terminal device based on the first association relationship, where the second association relationship may be the same as or different from the first association relationship.

The first association relationship and the second association relationship are the same as the first association relationship and the second association relationship in the foregoing blocks 101 to 109 of FIG. 3. To be specific, to enable the second terminal device to indirectly communicate with the second base station through the first terminal device, when the second terminal device communicates with the first base station through the first terminal device, the first base station originally stores the first association relationship between the first terminal device and the second terminal device. Therefore, the first base station may directly send the first association relationship to the second base station, and the second base station establishes the second association relationship between the first terminal device and the second terminal device based on the first association relationship. In this way, the second terminal device does not need to perform measurement and report the measurement report to the second base station to trigger the second base station to establish the second association relationship between the first terminal device and the second terminal device. Therefore, an amount of signaling interaction of the second terminal device is reduced, and power consumption of the second terminal device can be reduced.

Then, as shown in the following blocks 208*a* and 209*a* and blocks 208*b* and 209*b*, the RRC reconfiguration process may be used to configure the first terminal device as the relay device, so that the second terminal device can indirectly communicate with the second base station through the first terminal device.

Block 208*a*. The second base station sends an RRC reconfiguration message to the first terminal device.

Block 209*a*. After completing a reconfiguration procedure, the first terminal device sends an RRC reconfiguration complete message to the second base station.

Block 208*b*. The second base station sends an RRC reconfiguration message to the second terminal device.

Block 209*b*. After completing a reconfiguration procedure, the second terminal device sends an RRC reconfiguration complete message to the second base station through the first terminal device.

Therefore, the handover method provided in this embodiment of the present invention may be applied to the foregoing handover system. When the first terminal device and the second terminal device need to be handed over from the first base station to the second base station, the first terminal device and the second terminal device may be separately handed over to the second base station as two independent terminal devices by using an existing handover procedure. Then, the first base station sends the first association relationship between the first terminal device and the second terminal device to the second base station, and the second base station establishes the second association relationship (the second association relationship may be the same as or different from the first association relationship) between the first terminal device and the second terminal device based on the first association relationship, so that the second terminal device can communicate with the second base station through the first terminal device based on the second association relationship. In this way, the second terminal device does not need to report a measurement report or a path switching request to the second base station. Therefore, an amount of signaling interaction of the second terminal device is reduced, power consumption of the second terminal device is reduced, and service continuity of the second terminal device is ensured.

The foregoing embodiments mainly describe the solutions provided in the embodiments of the present invention from a perspective of interaction between network elements. It may be understood that to implement the foregoing functions, the network elements such as the first base station 11, the second base station 12, the first terminal device 21, and the second terminal device 22 include corresponding hardware structures and/or software modules for implementing the functions. A person skilled in the art should be easily aware that in combination with example units and algorithm steps described in the embodiments disclosed in this specification, the present invention may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

In the embodiments of the present invention, function module division may be performed on the first base station 11, the second base station 12, the first terminal device 21, and the second terminal device 22 based on the foregoing method examples. For example, each function module may be obtained through division based on each corresponding function, or two or at least two functions may be integrated into one processing module. The integrated module may be implemented in a form of hardware, or may be implemented in a form of a software functional module. It should be noted that the module division in the embodiments of the present invention is an example, and is merely logical function division. There may be another division manner in actual implementation.

Figure 5:
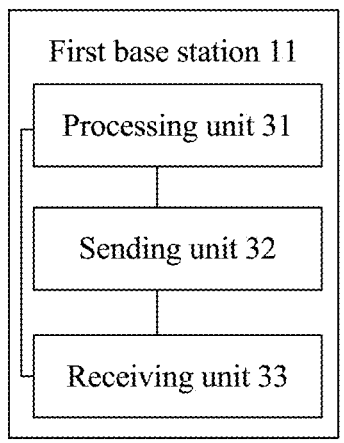
FIG. 5 is a schematic structural diagram of a first base station according to an embodiment of the present invention.

When each function module is obtained through division based on each corresponding function, FIG. 5 is a possible schematic structural diagram of the first base station 11 in the foregoing embodiment. The first base station 11 includes a processing unit 31, a sending unit 32, and a receiving unit 33. The processing unit 31 is configured to support the first base station 11 in performing the processes 102*a* and 102*b* in FIG. 3. The sending unit 32 is configured to support the first base station 11 in performing the processes 103, 106, and 108 in FIG. 3 and the processes 202*a*, 204*a*, 202*b*, 204*b*, and 206 in FIG. 4. The receiving unit 33 is configured to support the first base station 11 in performing the processes 101*a*, 101*b*, 105, and 107 in FIG. 3 and the processes 201*a*, 203*a*, 201*b*, and 203*b* in FIG. 4. All related content of blocks in the foregoing method embodiments may be cited in function descriptions of corresponding function modules. Details are not described herein again.

Figure 6:
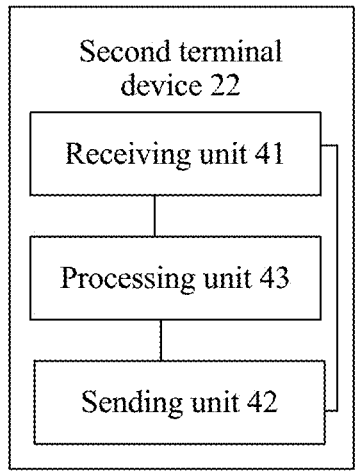
FIG. 6 is a schematic structural diagram of a second terminal device according to an embodiment of the present invention.

When each function module is obtained through division based on each corresponding function, FIG. 6 is a possible schematic structural diagram of the second terminal device 22 in the foregoing embodiment. The second terminal device 22 includes a receiving unit 41, a sending unit 42, and a processing unit 43. The receiving unit 41 is configured to support the second terminal device 22 in performing the process 106*b* in FIG. 3 and the processes 204*b* and 208*b* in FIG. 4. The sending unit 42 is configured to support the second terminal device 22 in performing the process 107 in FIG. 3 and the processes 205*b* and 209*b* in FIG. 4. The processing unit 43 is configured to process an RRC reconfiguration message received by the receiving unit 41, to generate RRC reconfiguration acknowledgement information or an RRC reconfiguration complete message. All related content of blocks in the foregoing method embodiments may be cited in function descriptions of corresponding function modules. Details are not described herein again.

Figure 7:
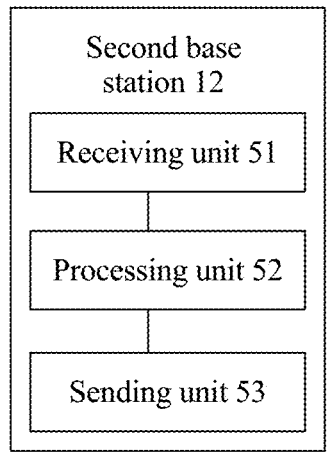
FIG. 7 is a schematic structural diagram of a second base station according to an embodiment of the present invention.

When each function module is obtained through division based on each corresponding function, FIG. 7 is a possible schematic structural diagram of the second base station 12 in the foregoing embodiment. The second base station 12 includes a receiving unit 51, a processing unit 52, and a sending unit 53. The receiving unit 51 is configured to support the second base station 12 in performing the processes 103 and 109 in FIG. 3 and processes 202a, 205a, 202b, 205b, 206, 209a, and 209b in FIG. 4. The processing unit 52 is configured to support the second base station 12 in performing the process 104 in FIG. 3 and the process 207 in FIG. 4. The sending unit 53 is configured to support the second base station 12 in performing the process 105 in FIG. 3 and the processes 203a, 203b, 208a, and 208b in FIG. 4. All related content of blocks in the foregoing method embodiments may be cited in function descriptions of corresponding function modules. Details are not described herein again.

Figure 8:
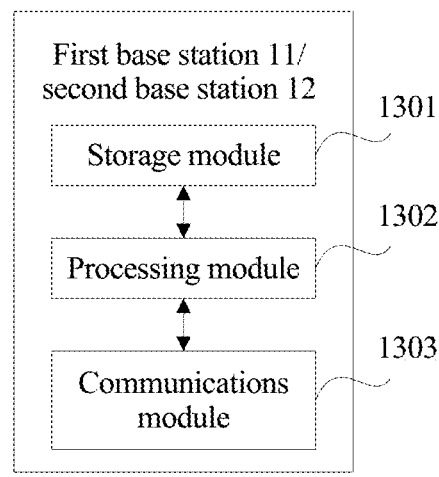
FIG. 8 is a schematic structural diagram 1 of hardware of a first base station/a second base station according to an embodiment of the present invention.

When an integrated unit is used, FIG. 8 is a possible schematic structural diagram of the first base station 11/the second base station 12 in the foregoing embodiment. The first base station 11/the second base station 12 includes a processing module 1302 and a communications module 1303. The processing module 1302 is configured to control and manage an action of the first base station 11. For example, the processing module 1302 is configured to support the first base station 11 in performing the processes 101 to 109 in FIG. 3, the processes 201 to 209 in FIG. 4, and/or another process for the technology described in this specification. The communications module 1303 is configured to support the first base station 11/the second base station 12 in communicating with another network entity, for example, communicating with function modules or network entities such as the first terminal device 21 and the second terminal device 22 shown in FIG. 1. The first base station 11/the second base station 12 may further include a storage module 1301, configured to store program code and data of the base station.

The processing module 1302 may be a processor or a controller, for example, may be a central processing unit (CPU), a general-purpose processor, a digital signal processor (DSP), an application-specific integrated circuit (ASIC), a field programmable gate array (FPGA) or another programmable logical device, a transistor logical device, a hardware component, or a combination thereof. The processing module 1302 may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 1303 may be a transceiver, a transceiver circuit, a communications interface, or the like. The storage module 1301 may be a memory.

When the processing module 1302 is the processor, the communications module 1303 is the communications interface. When the storage module 1301 is the memory, the first base station/the second base station in this embodiment of the present invention may be the first base station 11/the second base station 12 shown in FIG. 9.

Figure 9:
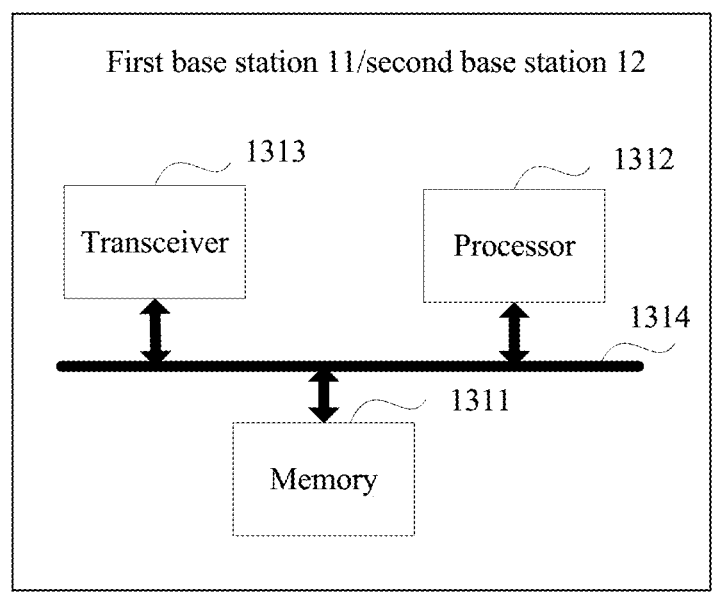
FIG. 9 is a schematic structural diagram 2 of hardware of a first base station/a second base station according to an embodiment of the present invention.

Referring to FIG. 9, the first base station 11/the second base station 12 may specifically include a processor 1312, a transceiver 1313, a memory 1311, and a bus 1314. The transceiver 1313, the processor 1312, and the memory 1311 are connected to each other through the bus 1314. The bus 1314 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 13B, but this does not mean that there is only one bus or only one type of bus.

Method or algorithm blocks described in combination with the content disclosed in the present invention may be implemented by hardware, or may be implemented by a processor by executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a mobile hard disk, a compact disc read-only memory (CD-ROM), or any other form of storage medium well-known in the art. For example, a storage medium is coupled to a processor, so that the processor can read information from the storage medium, and write information into the storage medium. In one embodiment, the storage medium may be a component of the processor. The processor and the storage medium may be located in the ASIC. In addition, the ASIC may be located in a core network interface device. In one embodiment, the processor and the storage medium may be in the core network interface device as discrete components.

A person skilled in the art should be aware that in the foregoing one or more examples, functions described in the present invention may be implemented by hardware, software, firmware, or any combination thereof. When being implemented by software, these functions may be stored in a computer-readable medium or transmitted as one or more instructions or code in the computer-readable medium. The computer-readable medium includes a computer storage medium and a communications medium, and the communications medium includes any medium for transmitting a computer program from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A handover method, comprising:
sending, by a first base station, handover group information to a second base station, wherein the handover group information comprises a first association relationship between a first terminal device and a second terminal device, wherein the first terminal device is a relay device to provide network service through the first base station or the second base station to the second terminal device that is a wearable device, and wherein the first association relationship indicates a mapping relationship that maps resources of the second terminal device used for communicating with the first base station to resources of the first terminal device to enable the second terminal device to communicate with the first base station through the first terminal device, and wherein the handover group information further comprises relay protocol stack architecture information, and the relay protocol stack architecture information is used to indicate a type of a relay architecture used by the second terminal device to connect to the first base station through the first terminal device; and receiving, by the first base station, handover response information from the second base station, wherein the handover response information comprises a second association relationship, the second association relationship is established by the second base station between the first terminal device and the second terminal device based on the first association relationship, and the second association relationship is used to hand over a handover group from the first base station to the second base station.

2. The method according to claim 1, before the sending, by a first base station, handover group information to a second base station, further comprising:
   determining, by the first base station, the first terminal device and the second terminal device as one handover group.

3. The method according to claim 2, wherein the determining, by the first base station, the first terminal device and the second terminal device as one handover group comprises:
   obtaining, by the first base station, context information of at least one of the first terminal device and the second terminal device; and
   in responsive to the context information indicating that there is a communication connection relationship or a pairing relationship between the first terminal device and the second terminal device, determining, by the first base station, the first terminal device and the second terminal device as the handover group.

4. The method according to claim 1, wherein the first association relationship comprises at least one of the following relationships: a mapping relationship between a radio bearer (RB) of the second terminal device and an RB of the first terminal device, a communication connection relationship between the first terminal device and the second terminal device, and a pairing relationship between the first terminal device and the second terminal device.

5. The method according to claim 1, wherein the handover group information further comprises identity indication information, and the identity indication information is used to indicate that the first terminal device is a relay device.

6. The method according to claim 1, wherein the handover group information further comprises at least one of evolved universal terrestrial radio access network radio access bearer (E-RAB) information of the first terminal device and the second terminal device, and radio resource control (RRC) context information of the first terminal device and the second terminal device.

7. The method according to claim 1, wherein the second association relationship comprises at least one of the following relationships: a mapping relationship that is between a radio bearer (RB) of the second terminal device and an RB of the first terminal device and that is established by the second base station, a communication connection relationship that is between the first terminal device and the second terminal device and that is established by the second base station, and a pairing relationship that is between the first terminal device and the second terminal device and that is established by the second base station.

8. A handover method, comprising:
   receiving, by a second base station, handover group information from a first base station, wherein the handover group information comprises a first association relationship between a first terminal device and a second terminal device, wherein the first terminal device is a relay device to provide network service through the first base station or the second base station to the second terminal device that is a wearable device, and wherein the first association relationship indicates a mapping relationship that maps resources of the second terminal device used for communicating with the first base station to resources of the first terminal device to enable the second terminal device to communicate with the first base station through the first terminal device, and wherein the handover group information further comprises relay protocol stack architecture information, and the relay protocol stack architecture information is used to indicate a type of a relay architecture used by the second terminal device to connect to the first base station through the first terminal device;
   establishing, by the second base station, a second association relationship between the first terminal device and the second terminal device based on the first association relationship; and
   sending, by the second base station, handover response information to the first base station, wherein the handover response information carries the second association relationship.

9. The method according to claim 8, wherein the second association relationship comprises at least one of the following relationships: a mapping relationship between a radio bearer (RB) of the second terminal device and an RB of the first terminal device, a communication connection relationship between the first terminal device and the second terminal device, and a pairing relationship between the first terminal device and the second terminal device.

10. An apparatus, comprising:
    a transceiver;
    a non-transitory memory storage comprising instructions; and
    one or more hardware processors in communication with the non-transitory memory storage, wherein the one or more hardware processors execute the instructions to:
    generate handover group information, wherein the handover group information comprises a first association relationship between a first terminal device and a second terminal device, wherein the first terminal device is a relay device to provide network service through the apparatus to the second terminal device that is a wearable device, and wherein the first association relationship indicates a mapping relationship that maps resources of the second terminal device used for communicating with the apparatus to resources of the first terminal device to enable the second terminal device to communicate with the apparatus through the first terminal device, and wherein the handover group information further comprises relay protocol stack architecture information, and the relay protocol stack architecture information is used to indicate a type of a relay architecture used by the second terminal device to connect to the apparatus through the first terminal device;
    send the handover group information to a base station; and
    receive handover response information from the base station, wherein the handover response information comprises a second association relationship, the second association relationship is established by the base station between the first terminal device and the second terminal device based on the first association relationship, and the association relationship is used to hand over a handover group from the apparatus to the base station.

11. The apparatus according to claim 10, wherein the one or more hardware processors further execute the instructions to determine the first terminal device and the second terminal device as one handover group.

12. The apparatus according to claim 11, wherein the one or more hardware processors further execute the instructions to: obtain context information of at least one of the first terminal device and the second terminal device; and in responsive to the context information indicating that there is a communication connection relationship or a pairing relationship between the first terminal device and the second terminal device, determine the first terminal device and the second terminal device as the handover group.

13. The apparatus according to claim 10, wherein the first association relationship comprises at least one of the following relationships: a mapping relationship between a radio bearer (RB) of the second terminal device and an RB of the first terminal device, a communication connection relationship between the first terminal device and the second terminal device, and a pairing relationship between the first terminal device and the second terminal device.

14. The apparatus according to claim 10, wherein the handover group information further comprises identity indication information, and the identity indication information is used to indicate that the first terminal device is a relay device.

15. The apparatus according to claim 10, wherein the handover group information further comprises at least one of evolved universal terrestrial radio access network radio access bearer (E-RAB) information of the first terminal device and the second terminal device, and radio resource control (RRC) context information of the first terminal device and the second terminal device.

16. The apparatus according to claim 10, wherein the second association relationship comprises at least one of the following relationships: a mapping relationship that is between a radio bearer (RB) of the second terminal device and an RB of the first terminal device and that is established by the base station, a communication connection relationship that is between the first terminal device and the second terminal device and that is established by the base station, and a pairing relationship that is between the first terminal device and the second terminal device and that is established by the base station.

17. An apparatus, comprising:
a transceiver;
a non-transitory memory storage comprising instructions; and
one or more hardware processors in communication with the non-transitory memory storage, wherein the one or more hardware processors execute the instructions to:
receive handover group information from a first base station, wherein the handover group information comprises a first association relationship between a first terminal device and a second terminal device, wherein the first terminal device is a relay device to provide network service through the first base station or the apparatus to the second terminal device that is a wearable device, and wherein the first association relationship indicates a mapping relationship that maps resources of the second terminal device used for communicating with the first base station to resources of the first terminal device to enable the second terminal device to communicate with the first base station through the first terminal device, and wherein the handover group information further comprises relay protocol stack architecture information, and the relay protocol stack architecture information is used to indicate a type of a relay architecture used by the second terminal device to connect to the first base station through the first terminal device;
establish a second association relationship between the first terminal device and the second terminal device based on the first association relationship; and
send handover response information to the first base station, wherein the handover response information carries the second association relationship.

18. The apparatus according to claim 17, wherein the second association relationship comprises at least one of the following relationships: a mapping relationship between a radio bearer (RB) of the second terminal device and an RB of the first terminal device, a communication connection relationship between the first terminal device and the second terminal device, and a pairing relationship between the first terminal device and the second terminal device.

* * * * *